US005406687A

United States Patent [19]

Caine

[11] Patent Number: 5,406,687

[45] Date of Patent: Apr. 18, 1995

[54] DOOR CLOSURE APPARATUS AND METHOD

[75] Inventor: Donald R. Caine, Greensboro, N.C.

[73] Assignee: CAMCO Manufacturing, Inc., Greensboro, N.C.

[21] Appl. No.: 179,381

[22] Filed: Jan. 10, 1994

Related U.S. Application Data

[63] Continuation of Ser. No. 11,712, Feb. 1, 1993, abandoned.

[51] Int. Cl.[6] .......... B23P 11/00; E05F 1/08

[52] U.S. Cl. .......... 29/436; 16/72; 16/76

[58] Field of Search .......... 16/49, 50, 71, 72, 73, 16/75, 76, 77; 49/381, 386, 163; 29/436

[56] References Cited

U.S. PATENT DOCUMENTS

| | | | |
|---|---|---|---|
| 768,718 | 8/1904 | Austin | 16/72 |
| 801,694 | 10/1905 | Sheppard | 16/72 |
| 1,804,385 | 5/1931 | Ferrin | 16/72 |
| 2,024,919 | 12/1935 | Fredricks et al. | 16/72 |
| 2,129,338 | 9/1938 | Timmons | 16/72 |
| 2,426,380 | 8/1947 | Swanson | 49/386 |
| 2,499,719 | 3/1950 | Boye | 16/72 |
| 2,709,274 | 5/1955 | Jorgenson | 16/72 |
| 3,287,757 | 11/1966 | Van Noord | 16/72 |
| 4,149,295 | 4/1979 | Owen | 16/72 |
| 4,299,058 | 11/1981 | Spaulding | 16/72 |

FOREIGN PATENT DOCUMENTS

| | | | |
|---|---|---|---|
| 366428 | 1/1923 | Germany | 49/386 |

*Primary Examiner*—Irene Cuda

*Assistant Examiner*—David P. Bryant

[57] ABSTRACT

A door closure apparatus is provided for lightweight screen doors and the like as are used on recreational vehicles, campers and motor homes. The method of attachment of the closure apparatus includes a pair of spaced apart coil springs which are affixed to the upper and lower hinges of the door by threaded screws. The springs are positioned to expand when the door is opened thereby creating a resilient force to evenly return the door to its closed posture.

11 Claims, 4 Drawing Sheets

DOOR CLOSURE APPARATUS AND METHOD

This is a continuation of application Ser. No. 08/011,712 filed Feb. 1, 1993, now abandoned.

BACKGROUND OF THE INVENTION

1. Field of The Invention

The invention herein pertains to door closing mechanisms and particularly to mechanisms which are used for lightweight screen doors and the like as are found on recreational vehicles and motor homes.

2. Description Of The Prior Art And Objectives Of The Invention

The invention herein pertains to a device for closing lightweight screen or accessory doors as are used on recreational vehicles which is different from devices herebefore known. In the past, various types of spring door closing arrangements have been utilized such as seen in U.S. Pat. No. 4,149,295 whereby a single spring is looped over a 180° central hinge to urge the door closed. Other spring devices are known which attach at the top of a door to provide assistance in closing. With careful attention being paid to manufacturing costs in recent years, recreational vehicle door manufacturers have reduced the weight of aluminum extrusions and other components of screen and accessory doors to save material, labor and costs. Currently, screen doors are manufactured which are lightweight and which can be easily bent or warped. Thus it has been found that available door closure mechanisms may not be entirely suitable for modern lightweight screen doors and some older type devices may actually cause the newer doors to warp, bend or not fully close and some will not close the door satisfactory during wind gusts or strong breezes as the spring force generated is insufficient.

With the disadvantages and problems associated with prior art devices, it is one objective of the present invention to provide door closure apparatus which will conveniently and sufficiently close a lightweight screen door without warping or bending, It is still another objective of the present invention to provide a door closure apparatus and method whereby the apparatus which will attach at two distant points on the door to insure smooth, even forces are applied thereto during closing.

It is another objective of the present invention to provide a door closure apparatus attachment method which includes a pair of coil springs attached to the door hinges for easy, convenient installation.

Various other objectives and advantages of the present invention become apparent to those skilled in the art as a more detailed presentation is set forth below,

SUMMARY OF THE INVENTION

The aforesaid and other objectives are realized by providing door closure apparatus which includes a pair of door mechanisms which include resilient coil spring members which are affixed by one end to the door jamb and the other end to a 180° hinge attached to a screen door. The apparatus includes a pair of such springs which are spaced along the door jamb and are attached to the door near or on the upper and lower hinges and extend angularly across the door/jamb intersection to the door jamb. Upon door opening, the springs are expanded thereby urging the door to return to its closed posture by evenly distributed forces which completely close the door and prevent it from warping or bending.

DESCRIPTION OF THE PREFERRED EMBODIMENT

Figure 1:
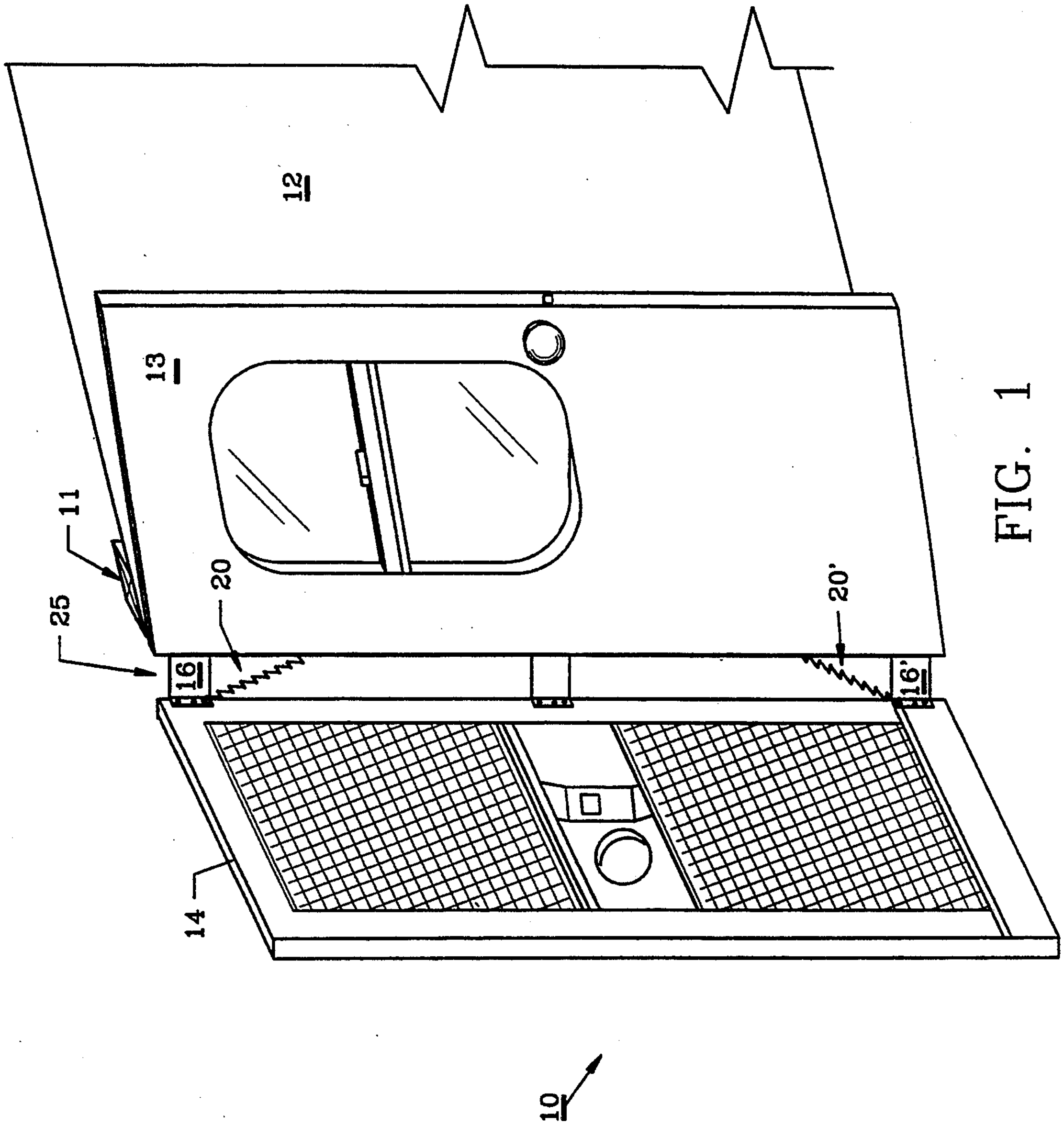
FIG. 1 demonstrates a standard recreational vehicle door which has been opened as seen from the outside with door closure apparatus attached to the screen door.
Figure 2:
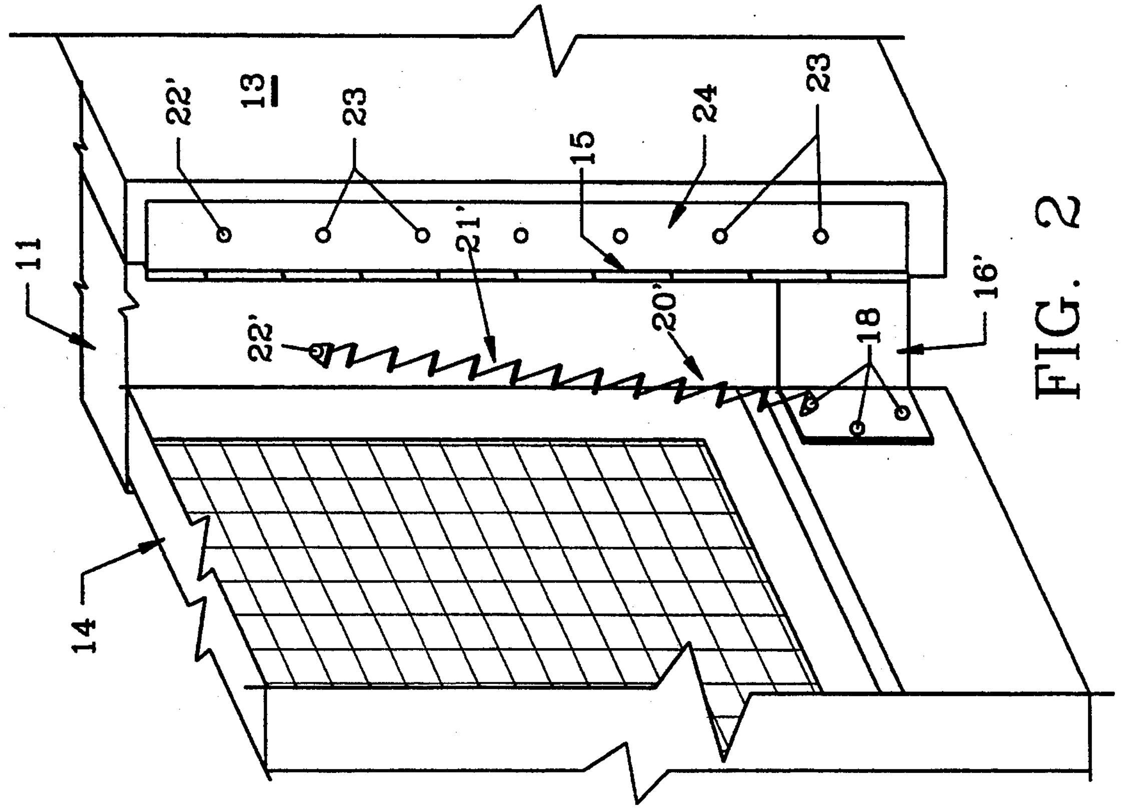
FIG. 2 pictures a close-up view of the lower mechanism of the door closure apparatus as seen in FIG. 1.
Figure 3:
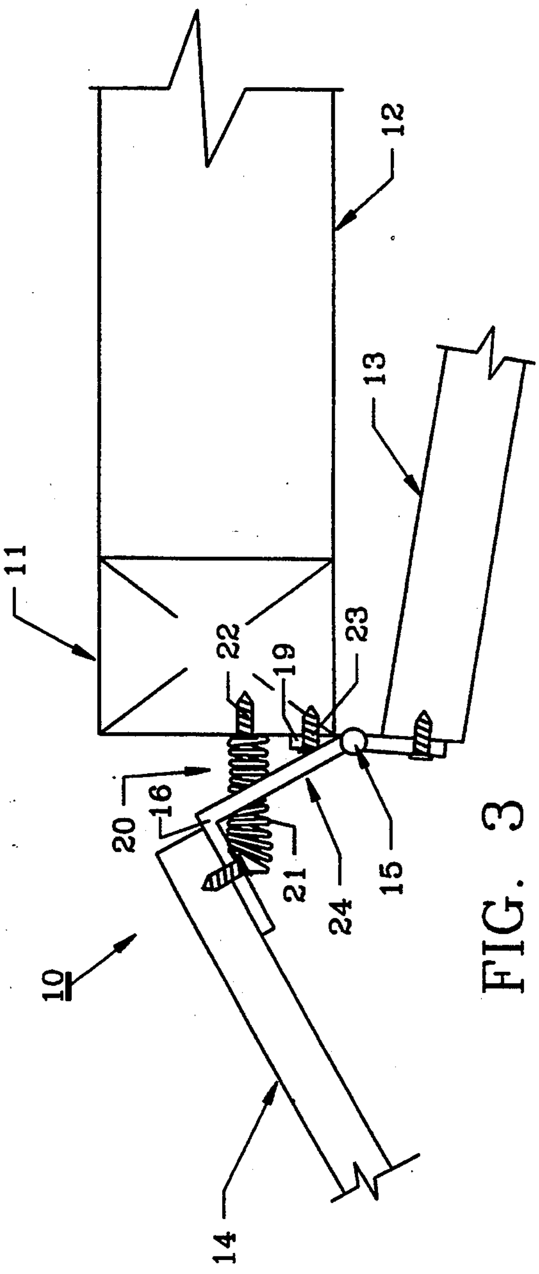
FIG. 3 depicts a top sectional view of the door and closure apparatus as shown in FIG. 1.

The preferred form of the invention is shown in FIGS. 1, 2 and 3 whereby a screen door closure apparatus includes a pair of resilient steel coil spring members which are each attached angularly at one end to the door frame and the other ends are attached to upper and lower sections of the screen door hinge. The method of attachment provides that resilient members are affixed to the hinge and door frame by threaded members such as metal screws. Thus, upon opening, the screen door is evenly urged to return to its closed posture by forces equally distributed at the top and bottom of the door on the upper and lower door hinges. Equal distribution of forces prevents the door from warping or bending after prolonged use and assist in completely closing the door along its entire length during periods of wind gusts or strong breezes.

DETAILED DESCRIPTION OF THE DRAWINGS AND OPERATION OF THE INVENTION

Secondary doors such as screen doors on recreational vehicles, campers, motor homes and the like are often made of relatively thin aluminum frames and can easily warp or bend. As such, these doors require a relatively light force to close under normal circumstances but due to their lightweight nature, an uneven pull such as at the top, middle or bottom alone may tend to warp or bend the frames, rendering the closure process relatively ineffective after a fairly prolonged period of use. Thus, it has been found that by placing a plurality of springs at both the top and bottom of the screen door, the door can be effectively used for an extended period of time without damage or warping. Also, during periods of high winds, the improved closure apparatus provides a more uniform force to the door and encourages closing in bad weather conditions, For a precise understanding of the invention apparatus and the method of attachment, looking now to the drawings, FIG. 1 demonstrates a conventional recreational vehicle (RV) door assembly 10 as seen from outside the RV. Door jamb 11 is attached behind RV outside wall 12 and hingedly mounted thereto is an outside door 13 and an inside lightweight screen door 14. Doors 13 and 14 are swingably attached to jamb 11 along conventional segmented hinge pin cylinder 15 seen in detail in FIG. 2. Door closure apparatus 25 which is attached to screen door 14 includes upper closure mechanism 20 and lower closure mechanism 20'.

FIG. 2 illustrates a close-up view of lower hinge section 16' as seen in FIG. 1. Lower hinge section 16' like upper hinge section 16 is part of sectional hinge 24 with first lower hinge section 16' joined to screen door 14 via threaded screws 18. Second section 19 (FIG. 3) of hinge 24 is attached by screw 23 to jamb 11 and to pin cylinder 15. As would be understood, both doors 13 and 14 swing about the pivot line defined by pin cylinder 15 and both can open outwardly approximately 180° as shown by outside door 13 in FIG. 1. Closure mechanism 20' is shown enlarged in FIG. 2 and consists of resilient longitudinal member 21' which is affixed by threaded member 22' to door jamb 11 at one end and the other end of longitudinal member 21' is attached by threaded member 18 to first hinge section 16'. Longitudinal member 21' may also be affixed to screen door 14 proximate hinge section 16' if desired, rather than directly to hinge 16'. However, hinge 16' provides a convenient means of attachment. In FIG. 3 a top view of RV door assembly 10 as shown in FIG. 1 is seen with closure mechanism 20 located between outside door 13 and screen door 14 when both doors are closed. As would be understood, closure mechanism 20 is identical to lower closure mechanism 20' except that resilient member 21 extends downwardly from sectional hinge 16.

Figure 4:
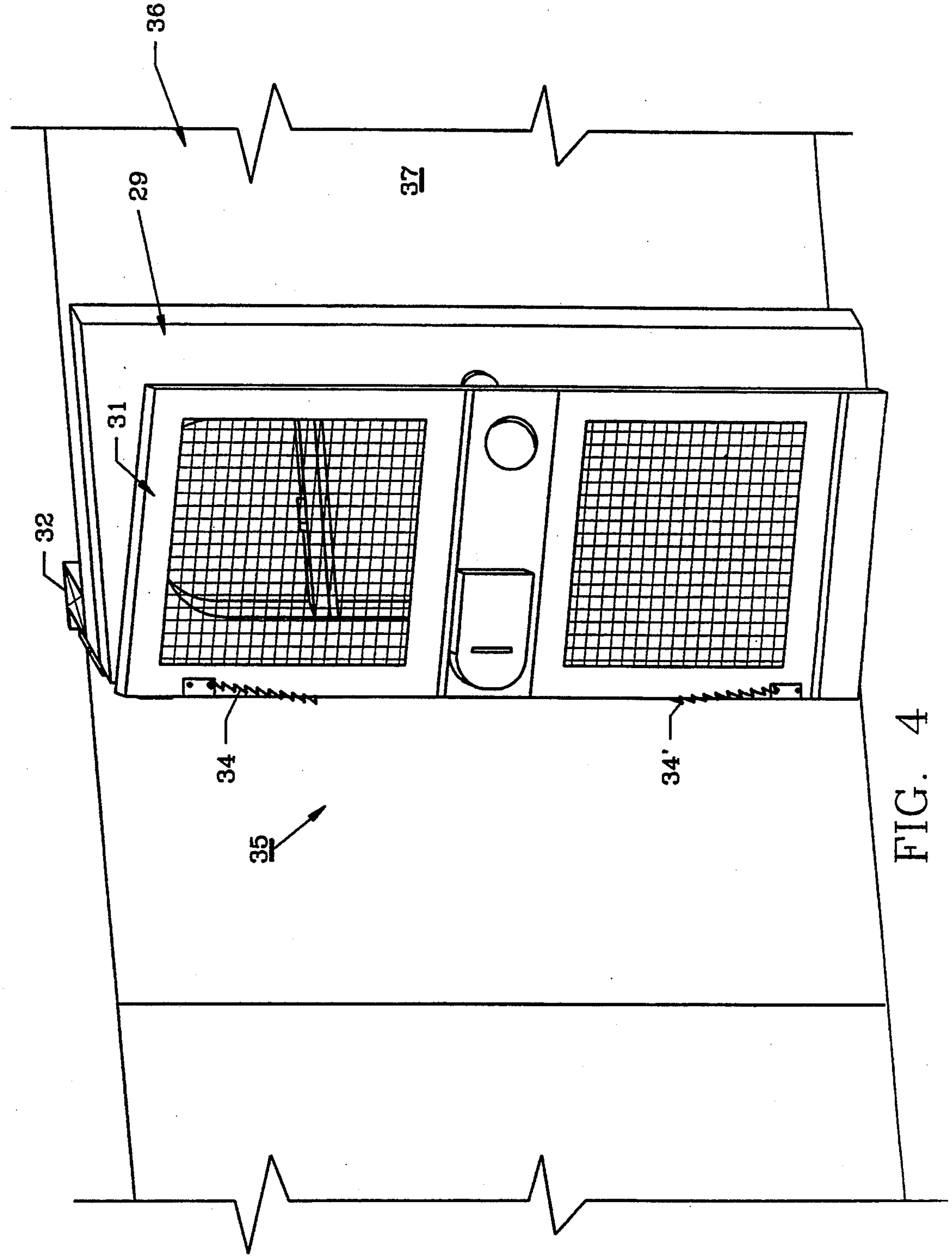
FIG. 4 shows another embodiment of a recreational vehicle screen door and closure apparatus as seen from outside the recreational vehicle with both doors opened.

Another door closure apparatus 35 is shown in FIG. 4 whereby screen door 31 is mounted on door jamb 32 attached to outside wall 36 of RV 37. As seen, resilient members 34, 34' are on the inside of screen door 31 as opposed to being between screen door 31 and outside door 29 as pictured in FIG. 3.

Figure 5:
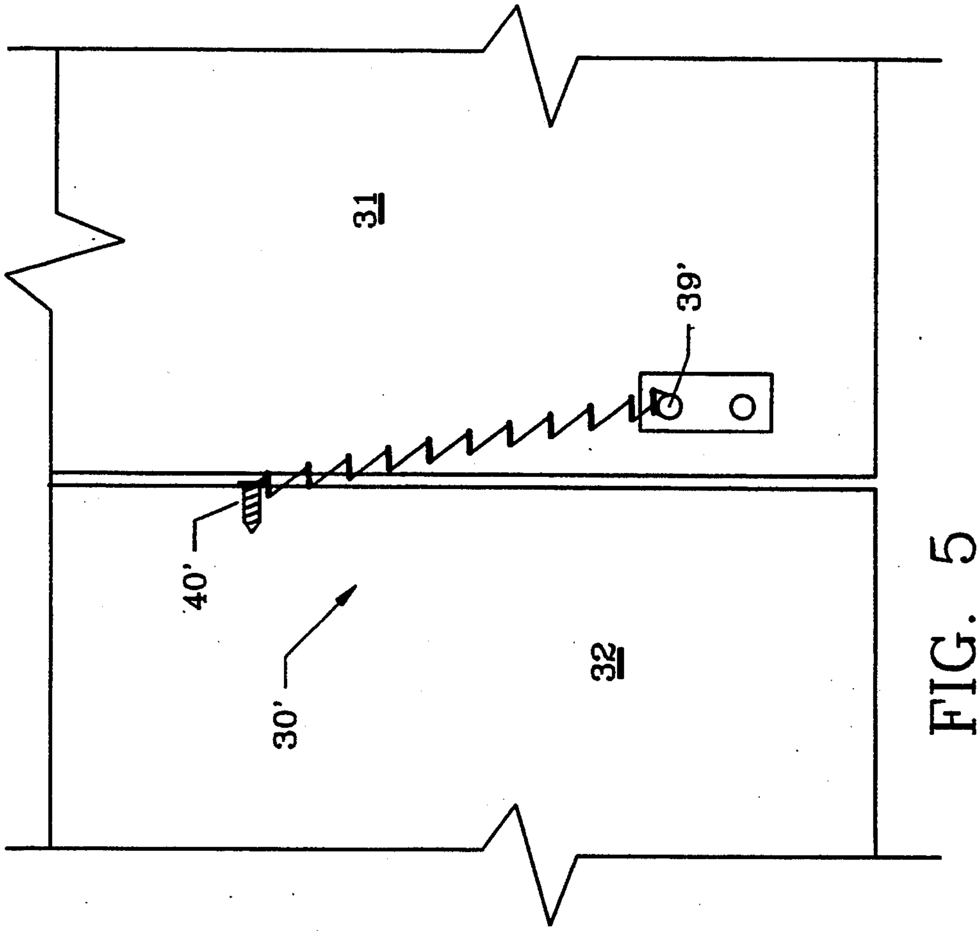
FIG. 5 shows a close-up view of the lower mechanism of the door closure apparatus as seen in FIG. 4.
Figure 6:
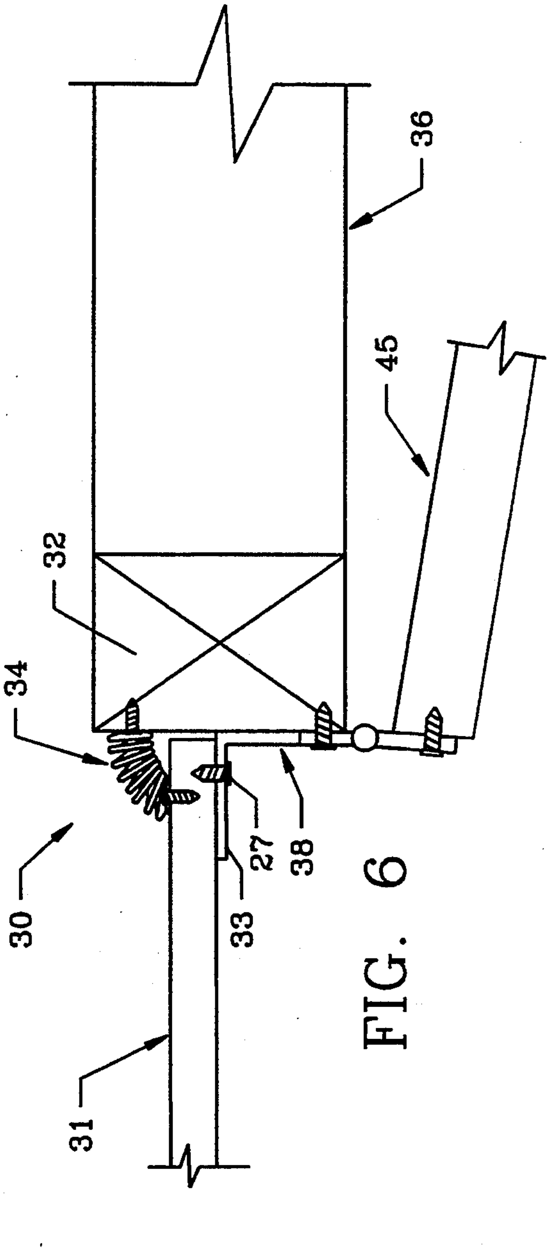
FIG. 6 features a top sectional view of the door and closure apparatus as shown in FIG. 4.

FIG. 5 presents a close-up view of the attachment of closure mechanism 30' as shown in FIG. 4. Hinge 38 (FIG. 6) includes a first section 33 which is attached by threaded members 27 to screen door 31. Lower threaded member 40' (FIG. 5) which consists of a metal screw affixes spring 34' to door jamb 32. The top sectional view as shown in FIG. 6 demonstrates closure mechanism 30 attached to closed screen door 31 and opened outside door 45.

The illustrations and examples provided herein are for explanatory purposes and are not intended to limit the scope of the appended claims.

I claim:

1. A door closure apparatus wherein a door is pivotally mounted to a door jamb by an upper and a lower sectional hinge, each hinge having a first section affixed to the door, substantially coplanar therewith, and a second section affixed to the door jamb, substantially coplanar therewith, the improvement comprising:

first and second independent, elongated, resilient, unidirectional coil members, one end of said first coil member affixed directly against and in contact with the door jamb proximate said upper hinge and the other end of said first coil member affixed directly against and in contact with the first hinge section of said upper hinge, and one end of said second coil member affixed directly against and in contact With the door jamb proximate said lower hinge and the other end of said second coil member affixed directly against and in contact with the first hinge section of said lower hinge;

whereby opening the door will cause each of said independent, elongated, resilient, unidirectional coil members to expand and, when expanded, urge the door closed.

2. The door closure apparatus as claimed in claim 1 wherein the door is a recreational vehicle door.

3. The door closure apparatus as claimed in claim 1 wherein the door is a screen door.

4. The door closure apparatus as claimed in claim 1 wherein said independent, elongated, resilient, unidirectional coil members are coil springs.

5. The door closure apparatus as claimed in claim 1 wherein one end of each of said independent, elongated, resilient, unidirectional coil members is affixed to the door jamb on the inside of the door.

6. A door closure apparatus for a screen door wherein the door is pivotally mounted to a door jamb by an upper and a lower sectional hinge, said hinges each having a first section affixed to the screen door, substantially coplanar therewith, and a second section affixed to the door jamb, substantially coplanar therewith, the improvement comprising:

first and second independent, elongated, resilient, unidirectional coil members, one end of said first coil member affixed directly against and in angular contact with the door jamb proximate said upper hinge and the other end of said first coil member affixed directly against and in angular contact with the first hinge section of said upper hinge, and one end of said second coil member affixed directly against and in angular contact with the door jamb proximate the lower hinge and the other end of said second coil member affixed directly against and in angular contact with the first hinge section of said lower hinge;

whereby opening the door will cause each of said independent, elongated, resilient, unidirectional coil members to expand and, when expanded, urge the door closed.

7. The door closure apparatus of claim 6 wherein said independent, elongated, resilient, unidirectional coil members are coil springs.

8. A method of closing a door having an upper and a lower hinge pivotally mounted within a door jamb, each hinge having a first section affixed to and substantially coplanar with the door and a second section affixed to and substantially coplanar with the door jamb, comprising the steps of:

(a) attaching one end of a first independent, elongated, resilient, unidirectional coil member directly against and in contact with the first section of the upper hinge;

(b) attaching the other end of said first coil member directly, angularly against and in contact with the door jamb proximate the upper hinge;

(c) attaching one end of a second independent, elongated, resilient, unidirectional coil member directly against and in contact with the first section of the lower hinge;

(d) attaching the other end of said second coil member directly, angularly against and in contact with the door jamb proximate the lower hinge;

(e) expanding said first and said second coil members by opening said door; and (f) closing said door by allowing said coil members to contract to their unexpanded state and thereby urge the door closed by evenly applying a closing force to said upper hinge and said lower hinge.

9. The method of claim 8 wherein the steps of attaching the other ends of each of said coil members directly against and in contact with the door jamb comprises attaching each of said coil members directly to the door jamb with screws.

10. The method of claim 8 and including the step of attaching said first coil member angularly between said upper hinge and the door jamb.

11. The method of claim 8 and including the step of attaching said second coil member angularly between said lower hinge and the door jamb.

* * * * *